(12) United States Patent
Moriyama et al.

(10) Patent No.: US 7,080,001 B2
(45) Date of Patent: Jul. 18, 2006

(54) SYSTEM FOR MONITORING A PERIOD OF AN OPERATION CLOCK SIGNAL OF A CPU AND STOPPING OPERATIONS OF THE CPU WHEN THE PERIOD IS OUT OF A PREDETERMINED ALLOWABLE RANGE

(75) Inventors: Naokatsu Moriyama, Chitose (JP); Shigeru Shinohara, Chitose (JP)

(73) Assignees: Renesas Technology Corp., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 547 days.

(21) Appl. No.: 10/372,970

(22) Filed: Feb. 26, 2003

(65) Prior Publication Data

US 2004/0117693 A1 Jun. 17, 2004

(30) Foreign Application Priority Data

Mar. 29, 2002 (JP) .............................. 2002-094820

(51) Int. Cl.
*G08B 21/00* (2006.01)
*G06F 1/04* (2006.01)

(52) U.S. Cl. ........................................ 703/600; 726/34

(58) Field of Classification Search ................ 713/600; 324/85; 702/117; 726/34
See application file for complete search history.

(56) References Cited

U.S. PATENT DOCUMENTS

| 4,255,792 | A  | * | 3/1981  | Das ............................ 702/117 |
| 4,414,623 | A  | * | 11/1983 | Davis et al. ................. 713/502 |
| 6,028,519 | A  | * | 2/2000  | Dessureau et al. ........ 340/573.1 |
| 6,381,699 | B1 | * | 4/2002  | Kocher et al. .............. 713/172 |
| 6,745,331 | B1 | * | 6/2004  | Silverbrook ................. 726/36 |

FOREIGN PATENT DOCUMENTS

EP 860882 A2 * 8/1998
JP 10-288635 10/1998

OTHER PUBLICATIONS

Bryant James, Ask The Applications Engineer-3, Feb. 2, 2002, http://web.archive.org/web/20020202113838/http://www.analog.com/library/analogDialogue/Anniversary/3.html.*

Hennessy John et al., Computer Organization and Design: The Hardware/Software Interface, 1998, Morgan Kaufmann Publishers Inc., 2nd Ed, pp. 655-658.*

* cited by examiner

*Primary Examiner*—Thomas Lee
*Assistant Examiner*—Mark Connolly
(74) *Attorney, Agent, or Firm*—Miles & Stockbridge PC (57) ABSTRACT

There is provided a technology for preventing disabling of function of a clock monitoring circuit by a hacker in a microcomputer for IC card provided with a clock monitoring circuit as a countermeasure for a hacker. In the microcomputer for IC card provided with the clock monitoring circuit, the clock monitoring circuit is given the function to perform the detecting operation twice during one cycle, namely at the timings of rise and fall of the clock.

6 Claims, 7 Drawing Sheets

SYSTEM FOR MONITORING A PERIOD OF AN OPERATION CLOCK SIGNAL OF A CPU AND STOPPING OPERATIONS OF THE CPU WHEN THE PERIOD IS OUT OF A PREDETERMINED ALLOWABLE RANGE

BACKGROUND OF THE INVENTION

The present invention relates to a semiconductor integrated circuit such as a microcomputer and microprocessor and more specifically to a technique which may be effectively applied to protect secret information of chip from illegal attack by hackers, for example, the technique which may be effectively applied to a microcomputer and microprocessor as a data processing device to be built into an IC card.

In recent years, instead of magnetic card as an information storage medium, attention is paid to a microprocessor as a data processing device comprising a built-in central processing unit (CPU) and an IC card comprising a built-in semiconductor integrated circuit (IC) such as microprocessor. An IC card is thought as a medium which can be effectively applied into a cash-card or a credit-card because of its higher security in comparison with a magnetic card. However, such IC card is used to process the data having higher secrecy of information because of its higher security. Therefore, it is probable that an ill-intentioned third party such as a hacker considers this IC card as an object for misappropriation of secret information with disassembling and analysis thereof in view of producing a forged IC card.

As a means for illegal attack to a microcomputer with a hacker, it is said to introduce a means to realize erroneous operation of a microcomputer by increasing the clock frequency. In order to protect secret information of a microcomputer for IC card from illegal attack by a hacker, there is known the technique that a circuit is provided to monitor the clock frequency within the microcomputer for IC card and a reset signal is generated to disable operation thereof when the clock higher than the predetermined frequency is inputted thereto.

A frequency detecting circuit which detects whether the clock frequency is within the specification or not is described in the Japanese Laid-Open Patent Publication No. Hei 10(1998)-288635.

SUMMARY OF THE INVENTION

However, in regard to the countermeasure technique for hackers, it has been proved that function of a clock monitoring circuit can be disabled easily when a hacker applies, for example, a voltage higher than the predetermined value to an input node of the clock monitoring circuit. Moreover, in the case of forming a clock monitoring circuit to monitor the clock frequency, the system for detecting a period by generating a voltage depending on pulse width of clock with a time-constant circuit consisting of a capacitance element and a resistance element can be realized more easily from the viewpoint of circuit configuration but this system also includes a demerit that the capacitance element forming the time-constant circuit becomes comparatively large in size and therefore it may be found easily by a hacker.

In addition, as a technique for protecting secret information of microcomputer for IC card from illegal attach by a hacker, there is proposed the technique that a mesh type protection shield is provided on a semiconductor chip where a microcomputer for IC card is formed and a voltage detecting circuit connected to the protection shield is also provided at the surface of semiconductor chip and when the protection shield is disconnected under the condition that the predetermined voltage is applied to the protection shield, cutting of the protection shield is detected with the voltage detecting circuit because the input voltage of the voltage detecting circuit is disconnected.

However, such countermeasure for hacker also has a demerit that the monitoring function can be easily disabled, for example, when a hacker removes the protection shield by applying a voltage higher than the predetermined voltage value to an input node of the voltage detecting circuit connected to the protection shield.

It is an object of the present invention to provide a technique to prevent discontinuation of monitoring circuit by a hacker in the microcomputer for IC card including a clock monitoring circuit as a countermeasure for hacker.

It is another object of the present invention to provide a microcomputer for IC card which assures high level protection of secret information of chip from illegal attack by a hacker.

These and the other objects and the novel features of the present invention will become apparent from the description of the specification and the accompanying drawings.

The typical inventions disclosed in this specification will be summarized as follows.

According to an aspect of the present invention, a pulse width detecting circuit for generating a voltage depending on the pulse width of clock signal and a clock monitoring circuit including a discriminating circuit for discriminating the voltage generated by the pulse width detecting circuit with the predetermined threshold value level in the microcomputer for IC card including the clock monitoring circuit are given the function to judge an output of the discriminating circuit when the clock rises and falls, namely two times in one cycle. Accordingly, even when a hacker applies a signal of the predetermined frequency or higher to an input node of the clock monitoring circuit or when a hacker fixes a voltage of the input node, the clock monitoring circuit detects this event and operation of microcomputer for IC card can be stopped by generating, for example, a reset signal. Therefore, illegal action to discontinue the function of clock monitoring circuit can be prevented.

According to another aspect of the present invention, a protection shield is formed of a plurality of shielded wires and AC signals of different frequencies are impressed to one terminal of each shielded wire, while a disconnection detecting circuit consisting of a frequency detecting circuit is connected to the other terminal of the shielded wire. Thereby, when a hacker disconnects the protection shield, a disconnection detecting circuit detects this event to stop operation of chip by generating a reset signal. Accordingly, the illegal action to discontinue the function of protection shield can be prevented. For enlargement of area of shielded area with a small number of signals, it is recommended to provide the meandering shielded wire. More preferable result can also be obtained by providing such shielded wire in a pattern like a labyrinth drawn without lifting a pen from the paper surface.

DETAILED DESCRIPTION OF THE PREFERRED EMBODIMENTS

The preferred embodiments of the present invention will be described in detail.

Embodiment 1

Figure 1:
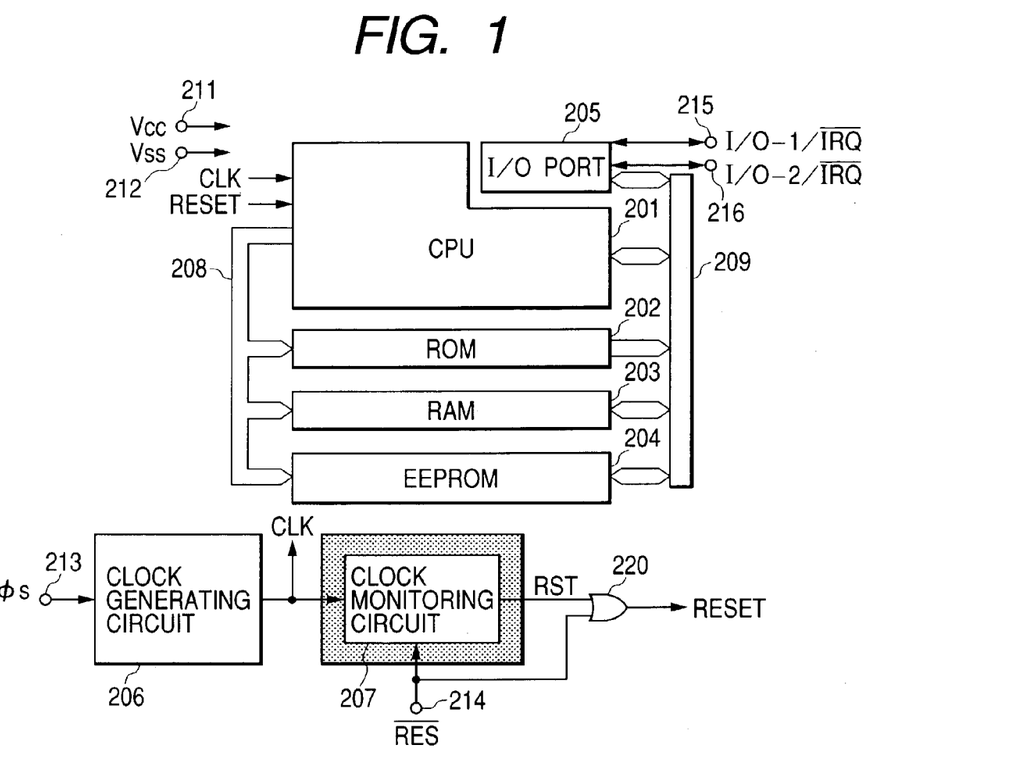
FIG. 1 is a block configuration diagram illustrating a schematic configuration of a microcomputer built in an IC card to which the present invention can be applied effectively.

FIG. 1 illustrates an example of configuration of a microcomputer for IC card to which the present invention can be applied effectively. In FIG. 1, 201 designates a CPU (Central Processing Unit) of the program control system for totally controlling a chip; 202, a ROM (Real Only Memory) for storing programs to be executed by the CPU and fixed data required for execution of programs; 203, a RAM (Random Access Memory) for providing a working area and a temporary storing area of the CPU201; 204, an EEPROM (Electrically Erasable and Programmable Read Only Memory) as a non-volatile memory for electrically erasing and writing data; 205, an external interface as an input/output port for transmitting and receiving signals between the system within the chip and an external device of card; 206, a clock generating circuit for generating a system clock $\phi_s$ required for operation of CPU201 and EEPROM204 by waveform shaping and frequency division of the clock signal CLK supplied from an external circuit of chip; 207, a clock monitoring circuit which is one of the points of the present invention. This clock monitoring circuit can be thought as a control circuit for detecting normal operation of CPU201 or irregular operation by illegal attach from a hacker.

These circuits are formed on a semiconductor chip such as a single crystalline silicon substrate and the CPU201, ROM202, RAM203, EEPROM204 and input/output port 205 are connected with each other via an address bus 208 and a data bus 209 for transmission and reception of data to and from external devices.

Moreover, in FIG. 1, 211 to 216 designate external terminals including power supply terminals 211, 212 for receiving power source voltages Vcc, Vss, clock terminal 213 for receiving clock signal $\phi_s$ from an external device of chip, reset terminal 214 for receiving a reset signal /RES for initializing the system and data input/output terminals 215, 216 connected to the input/output port 205 for serially inputting and outputting the data.

In this embodiment, although not particularly restricted, a rest signal /RES supplied from an external device of chip is supplied to the CPU201 and other circuits as the reset signal RESET through logical sum with the reset signal RST generated by the clock monitoring circuit 207. Moreover, the clock monitoring circuit 207 is configured to be cleared with the reset signal /RES supplied from an external device.

Figure 2:
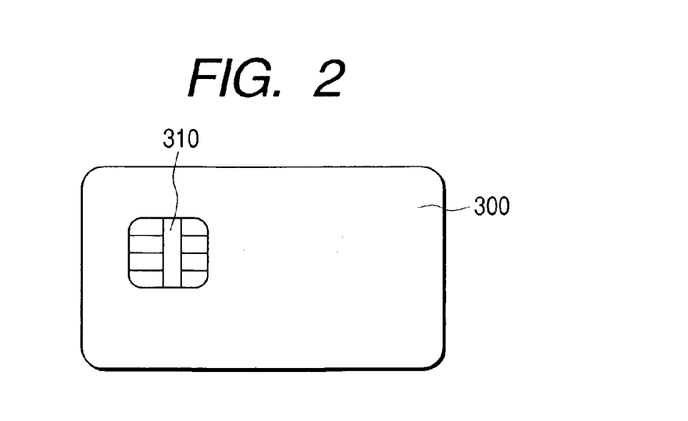
FIG. 2 is a schematic diagram illustrating the external appearance of an IC card of the present invention.

FIG. 2 illustrates an external appearance of an IC card comprising a microcomputer for card. In FIG. 2, 300 designates a card itself formed of plastic material and 310, an electrode portion as external terminals provided at the surface of the card 300 and electrically connected to external terminals 211 to 216 illustrated in FIG. 1. Moreover, the microcomputer chip for card illustrated in FIG. 1 is allocated at the lower side of electrode 310 in FIG. 2. The electrode 310 is accommodated within a package consisting of plastic material or mounted on a printed circuit board and is completely molded with resin or the like.

The IC card of the present invention is not restricted only to a contact type as illustrated in FIG. 2 and also may be a non-contact type IC card. In this case, the electrode 310 as the external terminal may be removed from the viewpoint of the external appearance. Moreover, the microcomputer to which the present invention is applied is never limited only to the microcomputer for IC card as described above.

Figure 3:
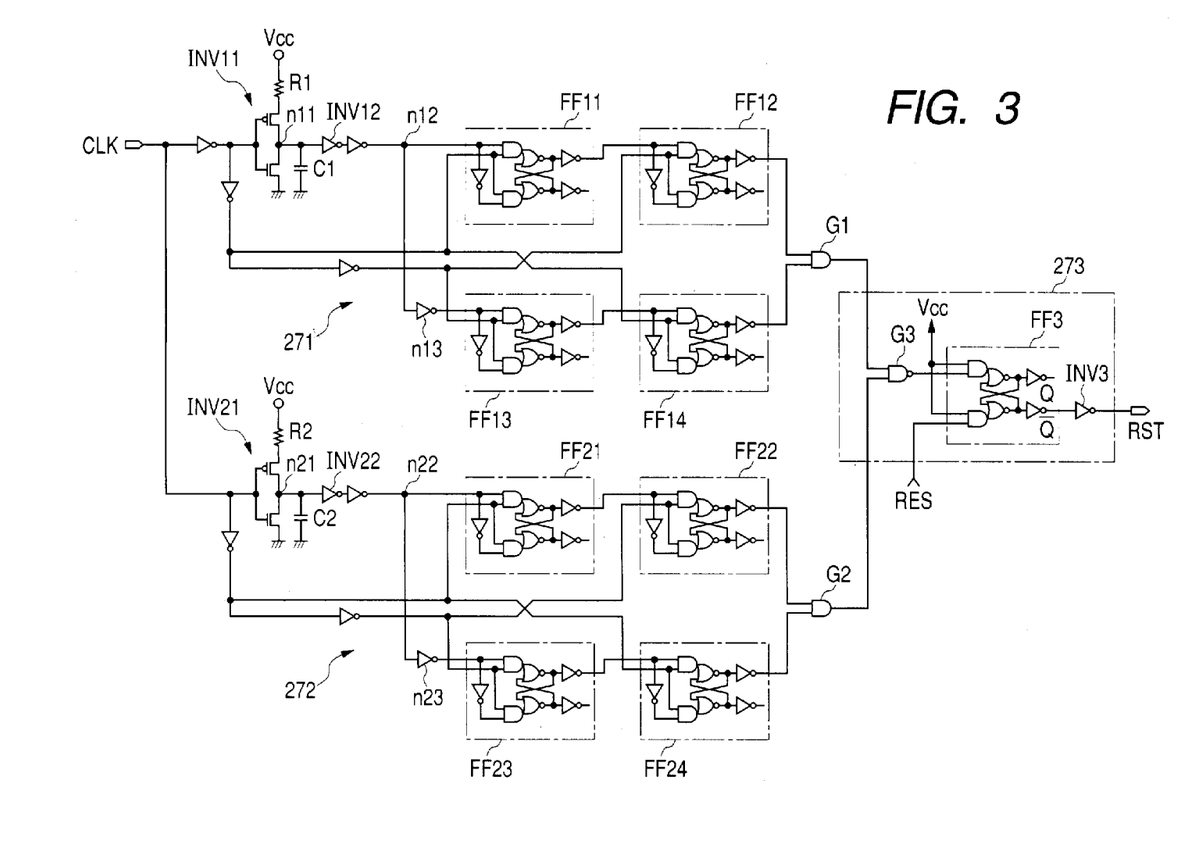
FIG. 3 is a circuit configuration diagram illustrating an embodiment of a clock monitoring circuit of the present invention.

FIG. 3 illustrates an embodiment of the clock monitoring circuit 207 of the present invention. A clock signal monitored with the clock monitoring circuit of this embodiment is supplied, in the microcomputer for card, to the CPU as the operation clock CLK thereof. The clock monitoring circuit of this embodiment has a function to generate a reset signal RST to the CPU when the frequency of clock CLK becomes higher than the preset frequency and a function to detect that an input terminal or internal node of the clock monitoring circuit is fixed to the high level or low level. The practical configuration and operation of this clock monitoring circuit will be described in detail.

The clock monitoring circuit illustrated in FIG. 3 is composed of a high level period monitoring circuit 271, a low level period monitoring circuit 272, and an output synthetic circuit 273 for generating a reset signal RST by synthesizing outputs of these monitoring circuits.

The high level period monitoring circuit 271 comprises a CMOS inverter INV11 connected in series to a resistor R1 in the P-MOS side to input an inverted phase clock /CLK, a capacitance C1 connected between an output node N11 of the inverter INV11 and the grounded point, an inverter INV12 for discriminating a potential Vn11 of the node N11, a first D-type flip-flop FF11 for latching an inverted output in synchronization with the normal phase clock /CLK, a second D-type flip-flop FF12 for latching an output of the FF11 in synchronization with the inverted phase clock CLK, a third D-type flip-flop FF13 for latching a signal in the same phase as an output of the inverter INV12 in synchronization with the inverted phase clock CLK, a fourth D-type flip-flop FF14 for latching an output of the FF13 in synchronization with the normal phase clock /CLK and an AND gate G110 for inputting outputs of the FF12 and FF14. A time constant circuit for generating a voltage depending on the pulse width of clock is configured with the resistor R1 and capacitor C1.

The low level period monitoring circuit 272 has the configuration identical to that of the high level period monitoring circuit 271. Only difference between the low level period monitoring circuit 272 and the high level period monitoring circuit 271 is that inputs are in the relation of inverted phase. The low level period monitoring circuit 272 comprises a CMOS inverter INV21 connected in series to a resistor R2 in the P-MOS side to input a normal phase clock CLK, a capacitor C2 connected between an output node N21 of the inverter INV21 and the grounded point, an inverter INV22 for discriminating a potential Vn21 of the node N21, a fifth D-type flip-flop FF21 for latching an inverted output of the inverter INV22 in synchronization with the normal phase clock /CLK, a sixth D-type flip-flop FF22 for latching an output of the FF21 in synchronization with the inverted phase clock CLK, a seventh D-type flip-flop FF23 for latching an output of the inverter INV22 in synchronization with the inverted phase clock CLK, an eighth D-type flip-flop FF24 for latching an output of the FF23 in synchronization with the normal phase clock /CLK and an AND gate G2 for inputting outputs of the FF22 and FF24.

The output synthetic circuit 273 is configured with a NAND gate G3 for inputting an output of the high level period monitoring circuit 271 and an output of the low level period monitoring circuit 272, an RS flip-flop FF3 for inputting an output of the gate G3 and a reset signal RES inputted from an external terminal and an inverter INV3 for outputting an inverted output /Q of the FF3. The output synthetic circuit 273 sets the output RST to the low level when any one of the outputs of the high level period monitoring circuit 271 and low level period monitoring circuit 272 is set to the low level and also clears the output RST to the low level because the flip-flop FF3 is reset when the reset signal RES inputted from an external device is set to the high level.

Figure 4:
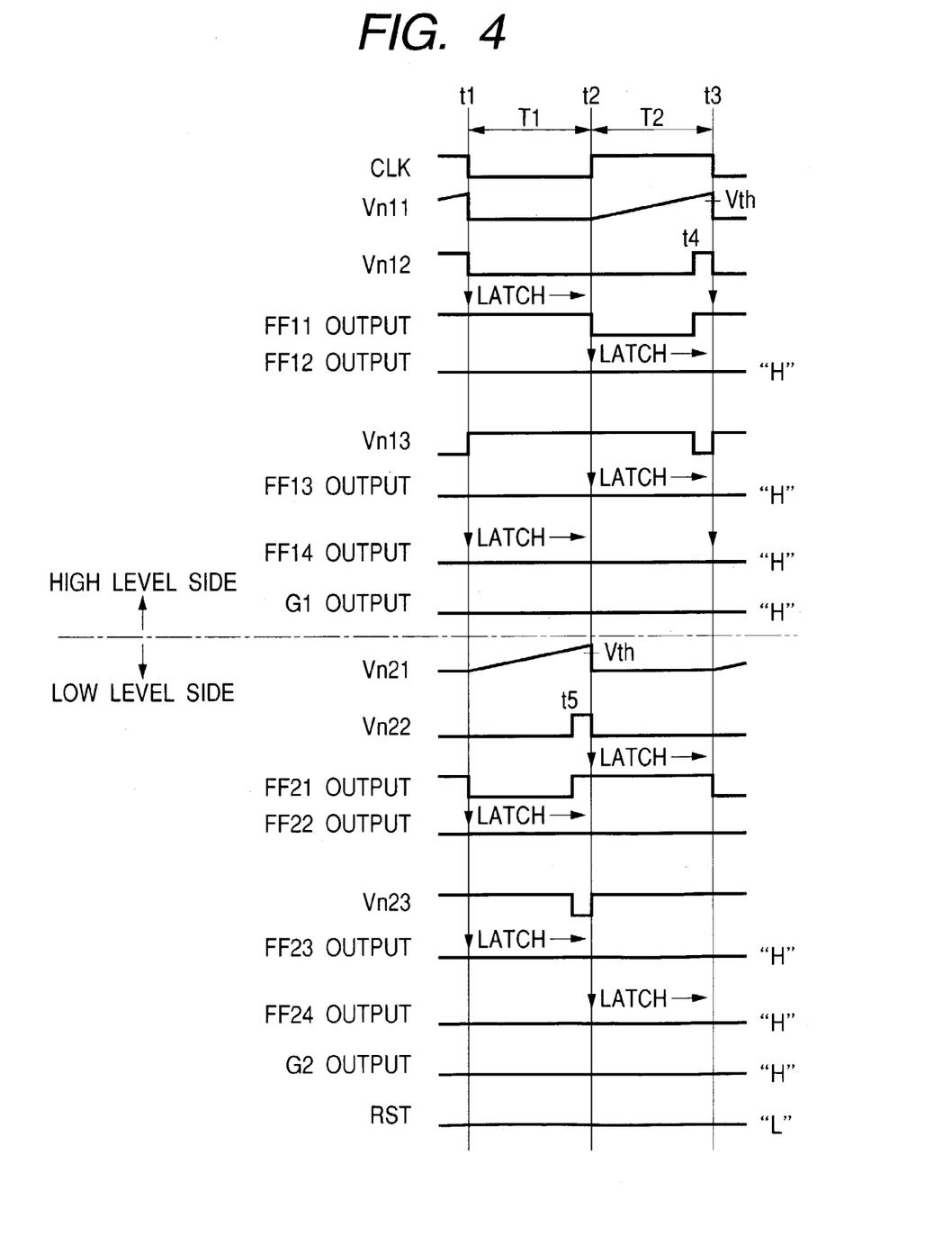
FIG. 4 is a timing chart illustrating the timings of various signals when the clock monitoring circuit operates normally.
Figure 5:
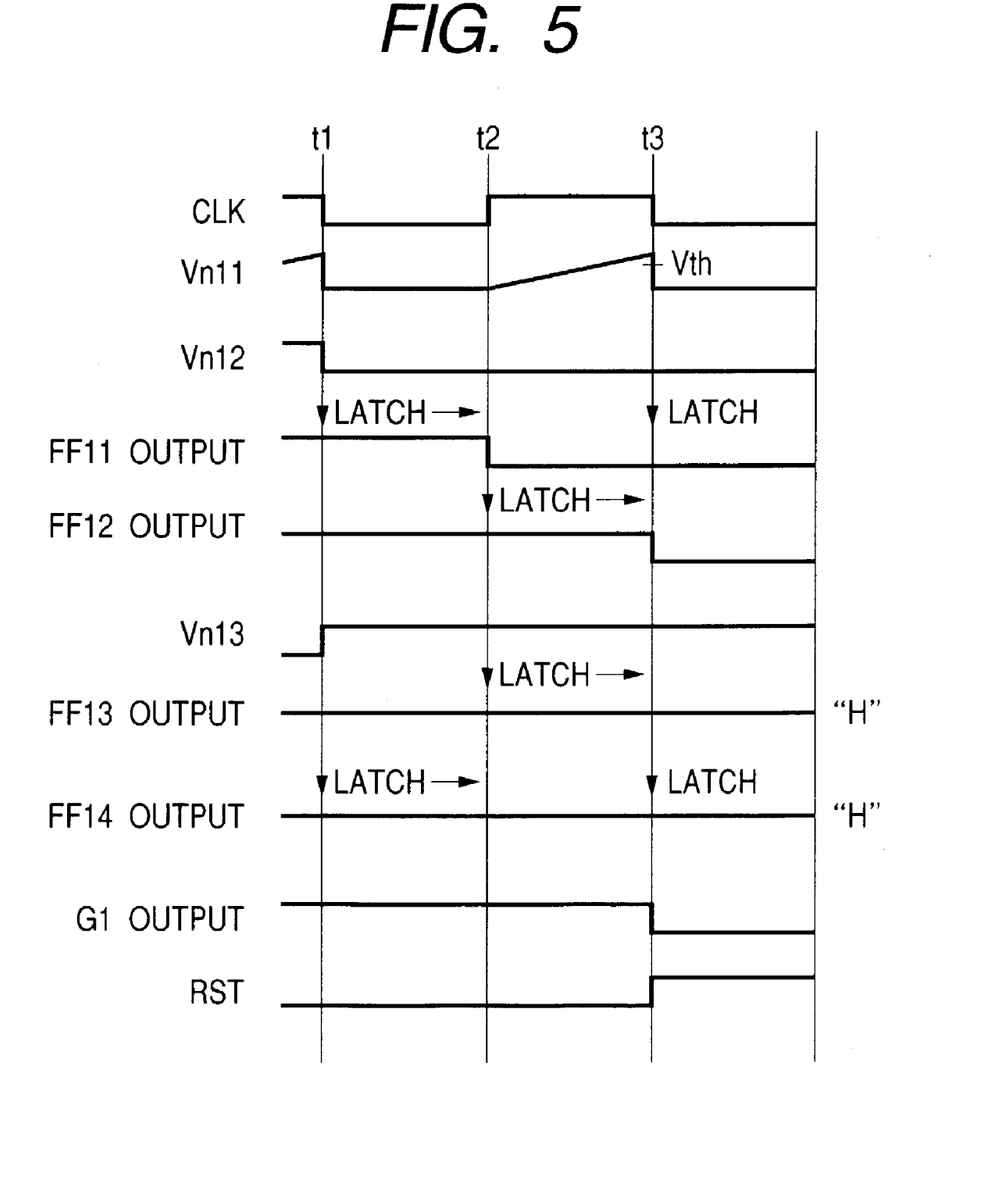
FIG. 5 is a timing chart illustrating timings of various signals of the clock monitoring circuit of FIG. 3 when a higher frequency clock is inputted as the system clock.
Figure 6:
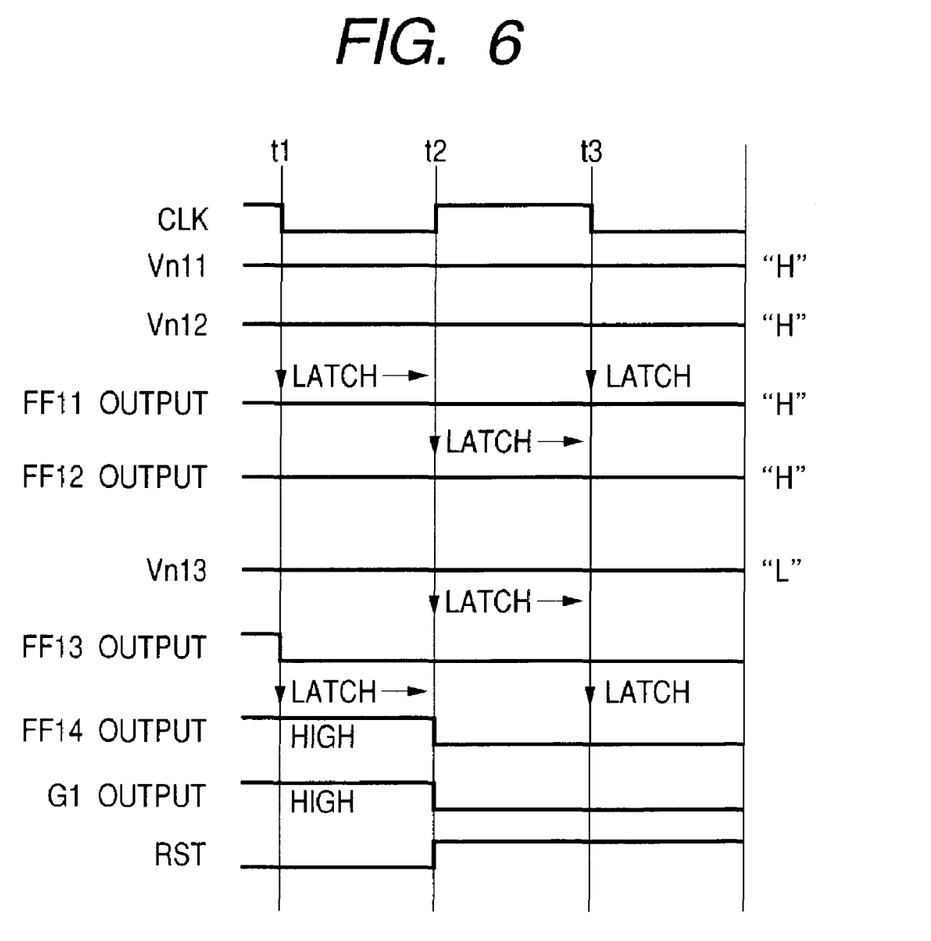
FIG. 6 is a timing chart illustrating timings of various signals of the clock monitoring circuit of FIG. 3 when a voltage at the input terminal or the internal node of the clock monitoring circuit is fixed.

Operations of the clock monitoring circuit will be described with reference to the timing charts of FIG. 4 to FIG. 6. FIG. 4 illustrates the timings when the clock CLK is normal, while FIG. 5 illustrates the timings when the clock in the frequency higher than the predetermined frequency is inputted and FIG. 6 illustrates the timings when an input of the clock monitoring circuit is fixed to the high level (Vcc).

In the period T1 where the clock CLK is in the low level, an output of the inverter INV11, namely the potential Vn11 of the node N11 is fixed to the ground potential. Therefore, an input of the flip-flop FF11, namely a potential Vn12 of the node N12 is also set to the ground potential. In this timing, the flip-flop FF11 holds, for the period of T1, the level (high level, in this case) latched in the timing t1 where the clock CLK is changed to the low level from the high level. Next, when the clock CLK rises to the high level (code t2), the P-MOS of inverter INV11 turns ON to charge the capacitor C1 via the resistor R1. Accordingly, potential of the capacitor C1 rises gradually up to the potential Vn11 of the node n11.

When the potential vn11 of the node n11 exceeds the threshold value Vth of the inverter INV12, an output of the inverter INV12 is inverted and the potential Vn12 of the node n12 changes to the high level (code t4). In this timing, since the flip-flop F11 is in the through condition, an output of the flip-flop FF11 also changes to the high level. Thereafter, the flip-flop FF11 latches the potential Vn12 of the node Vn12 in the timing t3 where the clock CLK falls to the low level and holds this level during the period T2 where the next clock is in the high level. Therefore, an output of the FF12 is maintained in the high level continuously during one clock cycle. When the clock CLK falls to the low level, the N-MOS of the inverter INV11 is turned ON. Accordingly, the capacitor C1 is discharged and the potential Vn11 of the node n11 immediately changes to the low level.

The potential Vn13 of the node n13 changes inversely for the potential Vn12 of the node N12. Moreover, since the flip-flop FF13 is operated with the clock in the phase inverted from the clock of the FF11, this flip-flop FF13 is set to the through condition during the period T1 where the clock CLK is in the low level. Accordingly, the potential Vn12 (high level) of the node Vn12 is transferred in direct to the subsequent stages. However, during the period T2 where the clock CLK is in the high level, the level (high level) latched in the timing t2 where the clock CLK changes to the high level from the low level is held. Therefore, an output of the flip-flop FF14 is maintained continuously in the high level during one clock cycle. As a result, an output of the AND gate G1 is also maintained continuously in the high level during one clock cycle.

Meanwhile, operations of the low level period monitoring circuit 272 are basically identical to the operations of the high level period monitoring circuit 271, only except for that the operations in the period T1 where the clock CLK is in the low level and in the period T2 where the clock CLK is in the high level are inverted from the operations of the high level period monitoring circuit 271. Namely, in the period T1 where the clock CLK is in the low level, the P-MOS of the inverter INV21 turns ON to charge the capacitor C2 via the resistor R2. Therefore, the potential Vn12 of the node n21 rises gradually.

When the potential Vn21 of the node n21 exceeds the threshold value of the inverter INV22, an output of the inverter INV22 is inverted and the potential Vn22 of the node n22 changes to the high level (code t5). In this timing, since the flip-flop F21 is in the through condition, an output of the flip-flop FF21 also changes to the high level. Thereafter, the flip-flop FF21 latches the potential Vn22 of the node Vn22 in the timing t2 where the clock CLK rises to the high level and holds this high level during the period T2 where the next clock is in the high level.

In addition, when the clock CLK changes to the high level from the low level, since the N-MOS of the inverter INV21 is turned ON, the capacitor C2 is discharged and thereby the potential Vn21 of the node n21 is immediately changed to the low level. Accordingly an output of the inverter INV21, namely the potential Vn21 of the node N21 is fixed to the ground potential. Therefore, an input of the flip-flop FF21, namely the potential Vn22 of the node N12 is also grounded. In this timing, the flip-flop FF21 holds the level (high level, in this case) latched in the timing t2 where the clock CLK changes to the high level from the low level during the period T2. As a result, an output of the flip-flop FF22 is maintained in the high level continuously during one clock cycle.

The potential Vn23 of the node n23 changes inversely for the potential Vn22 of the node N22. Moreover, since the flip-flop FF23 is operated with a clock inverted from the clock of the FF21, the FF23 holds the level (high level, in this case) latched in the timing t1 where the clock CLK changes to the low level from the high level during the period T1 where the clock CLK is in the low level. Moreover, since the flip-flop FF23 is in the through condition during the period T2 where the clock CLK is in the high level, this FF23 transfers in direct the potential Vn23 (high level) of the node Vn23 to the subsequent stages. Accordingly, an output of the flip-flop FF24 is maintained continuously in the high level during one clock cycle. As a result, an output of the AND gate G2 is also maintained continuously in the high level during one clock cycle. Therefore, an output RST of the output synthetic circuit 273 is also never set to the low level and is maintained continuously in the high level.

As described above, it is possible to detect whether both low level period T1 and high level period T2 of the clock CLK satisfy the predetermined duration or not by providing the high level period monitoring circuit 271 and low level period monitoring circuit 272. Therefore, according to the clock monitoring circuit of the present embodiment, the clock having the duty ratio which is not the 50% in which any one of the low level period T1 and high level period T2 of the clock CLK satisfies the predetermined duration but the other does not satisfy the predetermined duration can also be detected when it is inputted.

Next, operations of the clock monitoring circuit when the clock of the frequency higher than the predetermined frequency is inputted will be described with reference to FIG. 5.

When the clock CLK of the frequency higher than the predetermined frequency is inputted, even if the capacitor C1 is charged during the high level period T2 of the clock CLK, it is discharged because the clock changes before the potential Vn11 of the node n11 exceeds the threshold value of the inverter INV12. Therefore, an output of the inverter INV12, namely the potential Vn12 of the node n12 is never changed to the high level. Accordingly, when the clock is normal, an output of the flip-flop FF11 which is changed to the high level in the timing t4 as illustrated in FIG. 4 is maintained in the low level as illustrated in FIG. 5. As a result, an output of the flip-flop FF12 is changed to the low level from the high level.

Moreover, when the clock CLK of the frequency higher than the predetermined frequency is inputted, the potential V13 of the node N13 is maintained in the high level. Therefore, outputs of the flip-flop FF13 and FF14 are maintained in the high level. As a result, an output of the AND gate G1 is changed to the low level at the timing t3 and thereby an output RST of the output synthetic circuit 273 is changed to the high level to reset the CPU.

On the other hand, since the low level period monitoring circuit 272 basically operates like the high level period monitoring circuit 271, only except for that operations in the low level period T1 of clock CLK and high level period T2 thereof are inverted from those of the high level period monitoring circuit 271, an output of the AND gate G2 is changed to the low level with deviation of half period. Accordingly, when an output of the AND gate G2 of the low level period monitoring circuit 272 changes fast to the low level, an output RST of the output synthetic circuit 273 is changed to the high level in this timing to reset the CPU.

Next, operations of the clock monitoring circuit of FIG. 3 when the input terminal of clock monitoring circuit or the node n11 connected to capacitor C1 is fixed to the high level will be described with reference to FIG. 6.

When the node n11 is fixed to the high level, the potential Vn12 of the node n12 and outputs of the flip-flops FF11, FF12 are respectively fixed to the high level. Since an output of the flip-flop FF12 is also fixed to the high level even during the normal operation as can be understood from FIG. 4, it is impossible to detect the fixed high level only with this signal.

However, since the flip-flops FF13, FF14 are provided in the clock monitoring circuit of this embodiment, when the node n11 is fixed to the high level, the potential Vn13 of the node n13 is fixed to the low level. Accordingly, when an output of the flip-flop FF13 is changed to the low level from the high level at the timing t1 as illustrated in FIG. 6, this FF13 is latched and held at the timing t2. Moreover, the flip-flop FF14 is changed to the low level from the high level at the timing t2 and is then latched and held at the timing t3. Thereafter, this FF14 is fixed to the low level. As a result, an output of the AND gate G1 is also changed to the low level at the timing t2. Thereby, an output RST of the output synthetic circuit 273 is changed to the high level to reset the CPU.

As described above, in the clock monitoring circuit of this embodiment, it is possible, in order to judge the condition of the node n11 connected to the capacitor C1 in both rising and falling edges of the clock CLK, to detect irregular fixed high level which cannot be detected only with the flip-flops FF11 and FF12.

Meanwhile, when the node n11 is fixed to the low level, the node n13 is fixed to the high level. Therefore, relationship between outputs of the flip-flops FF11, FF12 and outputs of the flip-flops FF13, FF14 is inverted from that of FIG. 6 and outputs of the flip-flops FF11, FF12 are fixed to the low level. Accordingly, an output of the AND gate G1 is changed to the low level and an output RST of the output synthetic circuit 273 is changed to the high level to reset the CPU.

Embodiment 2

Figure 7:
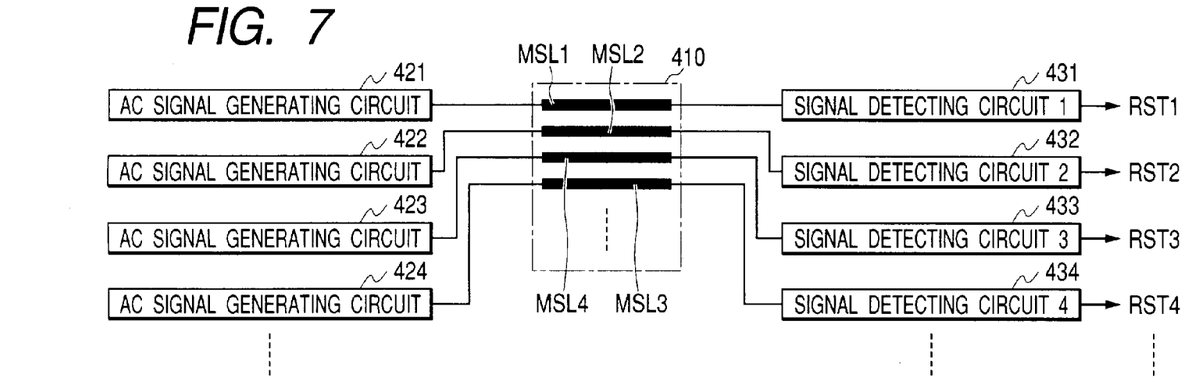
FIG. 7 is a configuration diagram illustrating a first embodiment of a security means of the present invention.
Figure 8:
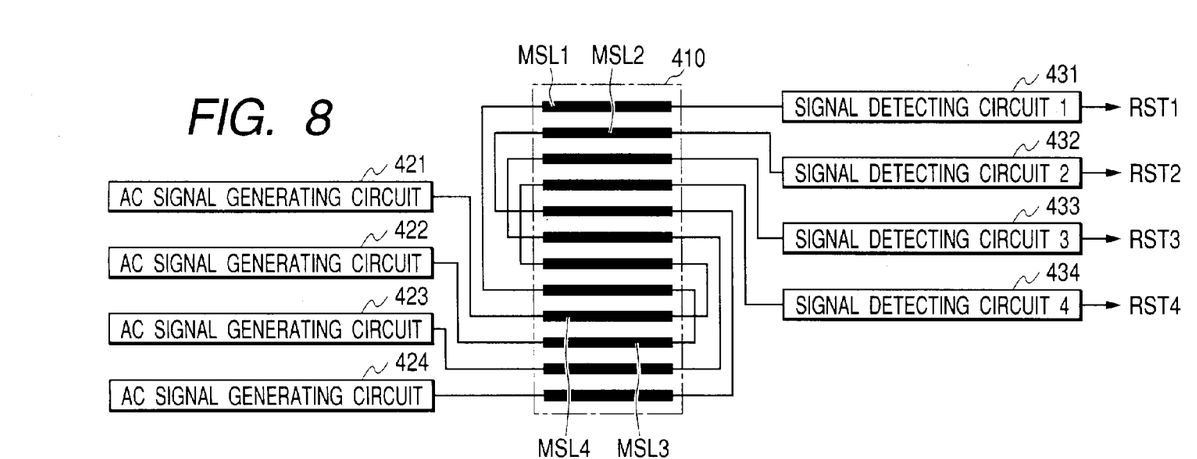
FIG. 8 is a configuration diagram illustrating a second embodiment of the security means of the present invention.
Figure 9:
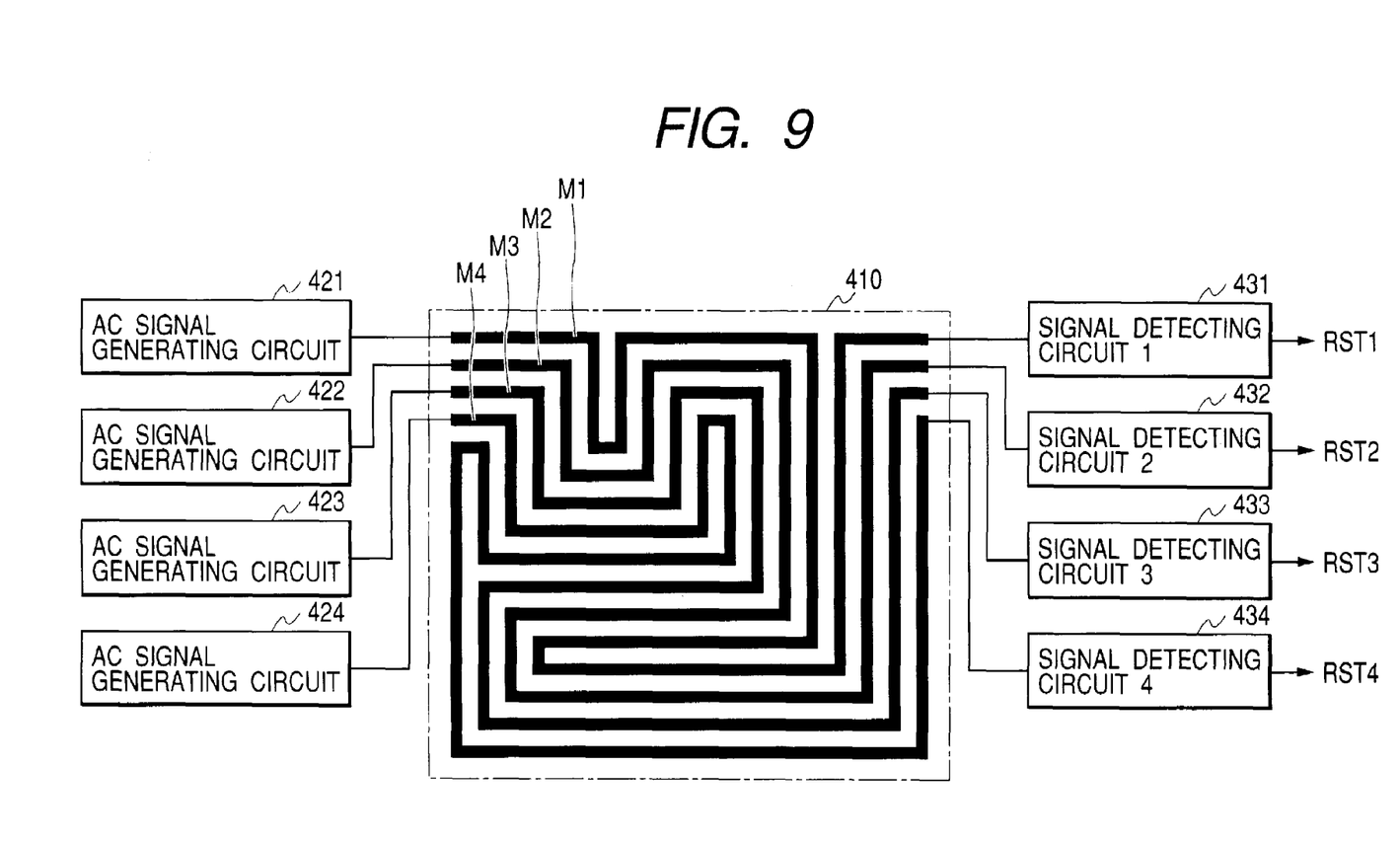
FIG. 9 is a configuration diagram illustrating a third embodiment of the security means of the present invention.

FIG. 7 and FIG. 8 illustrate an embodiment of a security means in the present invention. The security means in this embodiment is configured with a metal shield region 410 consisting of a plurality of signal lines MSL1, MSL2, . . . formed at the upper part of the substrate surface where a circuit is provided on the chip to be protected from illegal attach by a hacker, AC signal generating circuits 421, 422, . . . connected to one terminals (starting terminals) of the signal lines MSL1, MSL2, . . . for shielding to transfer AC signals of different frequencies or amplitudes to respective signal lines, and signal detecting circuits 431, 432, . . . consisting of detecting circuits for detecting frequencies or amplitudes of AC signals transferred from respective signal lines.

The signal detecting circuits 431, 432, . . . detect input signals and generate reset signals RST1, RST2, . . . when the input signals do not have predetermined frequencies or amplitudes and then supply a signal of logical SUM of these reset signals to the CPU201 in order to reset the CPU201. Accordingly, when the signal lines for shield MSL1, MSL2, . . . are disconnected, the CPU201 is reset. Therefore, when a hacker removes the signal lines MSL1, MSL2, . . . in order to modify the circuit under the metal shield region 410, a certain signal line is disconnected and the chip cannot operate any more. Accordingly, analysis of chip is disabled. Moreover, illegal analysis by a hacker who can remove the signal lines MSL1, MSL2, . . . under the condition that a pseudo signal is given thereto from an external device by setting a probe at the input of the signal detecting circuit becomes more difficult by providing a plurality of signal lines and then impressing AC signals of different frequencies or amplitudes to such signal lines.

In FIG. 7 of FIGS. 7 and 8, the signal lines for shield MSL1, MSL2, . . . are allocated in parallel in the metal shield region 410, while in FIG. 8, the signal lines MSL1, MSL2, . . . are allocated as the meandering signal lines. This meandering signal lines of FIG. 8 enables increase of area of the metal shield region 410 without increase in the kinds of shield signals. More preferable result may be obtained by forming the signal lines MSL1, MSL2, . . . like a labyrinth drawn without lifting a pen from the paper surface.

As a circuit to be protected from illegal attack by a hacker, there is provided, for example, the clock monitoring circuit 207 illustrated in FIG. 1. In this case, the metal shield region 410 described above is provided in the position indicated as the meshed area in FIG. 1. When the clock monitoring circuit 207 is covered in the metal shield region 410, it is difficult for a hacker to find out a capacitance element forming such clock monitoring circuit 207 and to fix the potential thereof. Accordingly, even when the clock monitoring circuit 207 is configured, for example, with a simplified circuit where the flip-flops FF13, FF14 of FIG. 3 and the low level period monitoring circuit 272 are eliminated, the clock monitoring circuit 207 can exhibits its full performance.

The circuit to be protected with metal shield is never limited only to the clock monitoring circuit 207 and any type of circuit to be protected for its secret information such as a part of CPU201 and ROM202 may be considered. Moreover, since provision of metal shield region 410 is identical to suggestion of existence of important circuit under this region to a hacker, it is also possible to provide a plurality of dummy metal shield regions to the vacant space of chip where the AC signal generating circuits 421, 422, . . . and signal detecting circuits 431, 432, . . . are not connected. The more the number of dummy metal shield regions is, the more difficult for a hacker to find out the target. As a result, security can be enhanced.

The AC signals generated by the AC signal generating circuits 421, 422, . . . may be the sine wave signals or pulse-wise clock signals. Therefore, since the AC signal generating circuits 421, 422, . . . may be configured with the well-known oscillation circuit, description of the practical circuit example and operation is omitted here. In addition, the signal detecting circuits 431, 432, . . . for detecting frequency or amplitude of the AC signals are not particular circuits and the well-known detecting circuits may be used as the signal detecting circuits. Therefore description of the practical circuit example and operation thereof is also eliminated.

The present invention has been described practically based on the preferred embodiments thereof, but the present invention is not limited only to the embodiments and allows various changes or modifications within the scope not departing from the contents of claims. For example, the clock monitoring circuit of above embodiments is provided with the high level period monitoring circuit 271 and the low level period monitoring circuit 272 but it is also possible to use only any one monitoring circuit as required.

Moreover, in the clock monitoring circuit in above embodiments, the resistors R1, R2 forming a time constant circuit to detect pulse width of clock is connected between the source terminal of P-MOS of the inverters INV11, INV21 and the power source voltage terminal Vcc, but it may be connected between the drain terminal of P-MOS and the output nodes n11, n12. In addition, it is also possible that the resistors R1, R2 are provided between the source of N-MOS and the grounded point, the capacitance element is first quickly charged with the P-MOS and then it is gradually discharged via the N-MOS and resistance element in order to gradually lower the voltage to generate a voltage depending on the pulse width. In this case, it is possible to detect that the frequency of clock signal is lower than the predetermined frequency through direct use of the circuits in the subsequent stage of the flip-flop circuit of FIG. 3 by setting a resistance value of resistance element to a comparatively large value and then maintaining the charging voltage above the threshold value of the inverter (discriminating circuit) when the clock to be monitored is equal to or higher than the predetermined frequency.

Moreover, in above embodiments, when it is detected that the frequency of clock signal is higher than the predetermined frequency, the reset signal RESET is applied to the CPU to stop the operation thereof, but it is also possible that operations of the CPU can be stopped by suspending supply of clock signal thereto in place of applying the reset signal.

The present invention has been described practically based on the preferred embodiments thereof but the present invention is never limited to above embodiments and allows various changes or modifications within the scope not departing from the contents of claims thereof. For example, in above embodiments, the present invention has been applied to the microcomputer for IC card but the present invention is not limited thereto and can also be applied to the microcomputer for the other purpose and to LSIs other than the microcomputer.

The effects disclosed by the present invention can be summarized as follows. Namely, according to the present invention, even if a hacker applies a signal in the frequency higher than the predetermined frequency to an input node of the clock monitoring circuit or fixes a voltage of the input node, the clock monitoring circuit of the present invention detects such illegal attack and stops operations of chip by generating, for example, a reset signal. Thereby, illegal disabling of function of the clock monitoring circuit can be prevented.

Moreover, according to the present invention, if a hacker disconnects the protection shield for security provided on the semiconductor chip, the disconnection detecting circuit detects such illegal attack and generates a reset signal to stop the operations of chip. As a result, illegal disabling of function of the protection shield can be prevented.

What is claimed is:

1. A data processing system comprising:
a central processing unit (CPU);
a memory;
an interface for transmitting and receiving data to and from external devices;
a bus for connecting said CPU, memory, and interface; and
a clock monitoring circuit for monitoring period of an operation clock signal of said CPU to stop operations of said CPU when the period of said operation clock signal goes out of a predetermined allowable range,
wherein said clock monitoring circuit includes:
a first pulse width detecting circuit for generating a first voltage depending on a pulse width of said operation clock signal;
a discriminating circuit for discriminating the first voltage generated by said first pulse width detecting circuit with a predetermined threshold voltage; and
a control circuit for detecting an output of said discriminating circuit in response to rise and fall of said clock signal and generating a signal to stop the operations of said CPU based on a result of detection of said output; and
wherein said clock monitoring circuit includes a logical inverting circuit for inverting logic of outputs of said discriminating circuit, and said first pulse width detecting circuit includes a first flip-flop circuit for latching outputs of said discriminating circuit in a timing of rise or fall of the clock signal and a second flip-flop circuit for latching outputs of said logical inverting circuit in the timing of fall or rise of the clock signal, and
wherein said signal generated by said control circuit is a reset signal for resetting operations of said CPU.

2. A data processing system according to claim 1,
wherein said control circuit further includes a third flip-flop circuit for latching an output of said first flip-flop circuit in the timing of fall or rise of the clock signal and a fourth flip-flop circuit for latching an output of said second flip-flop circuit in the timing of rise or fall of the clock signal to generate said reset signal based on the result of logical product of outputs of said third and fourth flip-flop circuits.

3. A data processing system according to claim 2, further comprising:
a second pulse width detecting circuit for generating a second voltage depending on a pulse width of signal in the inverted phase of said clock signal;
a second discriminating circuit for discriminating the second voltage generated by said second pulse width detecting circuit with a predetermined threshold voltage level; and
a second control circuit for respectively detecting an output of said second discriminating circuit in the timings of fall and rise of said clock signal.

4. A data processing system according to claim 3,
wherein said reset signal is generated based on a logical product of output of said control circuit and output of said second control circuit.

5. A data processing system formed on a semiconductor chip, comprising:
a central processing unit (CPU);
a memory;
an interface for transmitting and receiving data to and from external devices;
a bus for connecting said CPU, memory, and interface;
a clock monitoring circuit for monitoring period of an operation clock signal of said CPU to stop operation of said CPU when the period of said clock signal goes out of a predetermined allowable range;
a plurality of signal lines closely allocated to each other on said semiconductor chip to cover at least an upper part of said clock circuit;
AC signal generating circuits connected to first terminals of a plurality of said signal lines to generate AC signals respectively to a plurality of said signal lines;
signal detecting circuits connected to second terminals of a plurality of said signal lines to detect said AC signals; and
a control circuit for stopping operation of said CPU when said signal detecting circuits do not detect said AC signals,
wherein said clock monitoring circuit includes:
a pulse first width detecting circuit for generating a voltage depending on the pulse width of said clock signal;
a discriminating circuit for discriminating the voltage generated by said first pulse width detecting circuit with a predetermined threshold value;
a control circuit for detecting an output of said discriminating circuit in a timing of rise or fall of said clock signal and generating a signal to stop operation of said CPU based on a result of detecton of said output, and
wherein said clock monitoring circuit includes a logical inverting circuit for inverting logic of outputs of said discriminating circuit, and said first pulse width detecting circuit includes a first flip-flop circuit for latching outputs of said discriminating circuit in a timing of rise or fall of said clock signal and a second flip-flop circuit for latching outputs of said logical inverting circuit in the timing of fall or rise of the clock signal, and
wherein said signal generated by said control circuit is a reset signal for resetting operation of said CPU.

6. A data processing system according to claim 5,
wherein said AC signals on a plurality of said signal lines are AC signals of different frequencies or amplitudes.

* * * * *